United States Patent
Dugonjic-Bilic et al.

(10) Patent No.: US 10,399,902 B2
(45) Date of Patent: Sep. 3, 2019

(54) METHOD TO REDUCE THE WATER LOSS IN SLURRIES OR SOLUTIONS USED IN OIL FIELD AND GAS FIELD OPERATIONS

(71) Applicant: TouGas Oilfield Solutions GmbH, Frankfurt am Main (DE)

(72) Inventors: Fatima Dugonjic-Bilic, Offenbach (DE); Jasmin Meurer nee Buhler, Mainz (DE); Marita Neuber, Dreieich (DE)

(73) Assignee: TouGas Oilfield Solutions GmbH, Frankfurt (DE)

( * ) Notice: Subject to any disclaimer, the term of this patent is extended or adjusted under 35 U.S.C. 154(b) by 155 days.

(21) Appl. No.: 15/121,399

(22) PCT Filed: Feb. 24, 2015

(86) PCT No.: PCT/EP2015/053822
§ 371 (c)(1),
(2) Date: Aug. 25, 2016

(87) PCT Pub. No.: WO2015/128320
PCT Pub. Date: Sep. 3, 2015

(65) Prior Publication Data
US 2016/0362335 A1 Dec. 15, 2016

(30) Foreign Application Priority Data
Feb. 28, 2014 (EP) .................... 14000717

(51) Int. Cl.
| C04B 24/16 | (2006.01) |
| C09K 8/035 | (2006.01) |
| C09K 8/487 | (2006.01) |
| C04B 28/04 | (2006.01) |
| C04B 24/24 | (2006.01) |
| C04B 28/14 | (2006.01) |
| C09K 8/508 | (2006.01) |
| C04B 28/02 | (2006.01) |
| C04B 103/00 | (2006.01) |
| C04B 103/46 | (2006.01) |

(52) U.S. Cl.
CPC .......... *C04B 24/163* (2013.01); *C04B 24/243* (2013.01); *C04B 28/02* (2013.01); *C04B 28/04* (2013.01); *C04B 28/14* (2013.01); *C09K 8/035* (2013.01); *C09K 8/487* (2013.01); *C09K 8/5083* (2013.01); *C04B 2103/0051* (2013.01); *C04B 2103/465* (2013.01)

(58) Field of Classification Search
None
See application file for complete search history.

(56) References Cited

U.S. PATENT DOCUMENTS

| 3,629,101 A | 12/1971 | Hille et al. |
| 3,994,852 A | 11/1976 | Adams et al. |
| 4,015,991 A | 4/1977 | Persinski et al. |
| 4,048,077 A | 9/1977 | Englehardt et al. |
| 4,309,523 A * | 1/1982 | Engelhardt ........... C08F 220/58 507/121 |
| 5,379,841 A | 1/1995 | Pusch et al. |
| 6,380,137 B1 | 4/2002 | Heier et al. |
| 6,395,853 B1 | 5/2002 | Oswald et al. |
| 6,465,397 B1 * | 10/2002 | Patterson ............. C08F 220/56 507/222 |
| 7,360,598 B1 | 4/2008 | Lewis et al. |
| 2006/0019835 A1 | 1/2006 | Kayser et al. |
| 2010/0240802 A1 | 9/2010 | Matzinger et al. |
| 2011/0263465 A1 * | 10/2011 | Kayser ................. C04B 24/163 507/121 |

FOREIGN PATENT DOCUMENTS

| DE | 102005056436 A1 | 5/2007 |
| EP | 0192447 A3 | 8/1986 |
| WO | WO 2007/051971 A1 | 5/2007 |
| WO | WO 2013/152832 A1 | 10/2013 |

* cited by examiner

*Primary Examiner* — Jeffrey D Washville
(74) *Attorney, Agent, or Firm* — Hammer & Associates, P.C.

(57) ABSTRACT

The present invention relates to a method to reduce the water loss in slurries and solutions used in oil field or gas field operations, for example for drilling, cementing and completion operations by adding a copolymer having a high molecular weight characterized by a K value of at least 300, said copolymer comprising structural units derived from monomers having sulfonic acid or derivative thereof, phosphonic acid or derivative thereof and acrylamide functionality.

14 Claims, No Drawings

METHOD TO REDUCE THE WATER LOSS IN SLURRIES OR SOLUTIONS USED IN OIL FIELD AND GAS FIELD OPERATIONS

The present invention relates to a method to reduce the water loss in slurries and solutions used in oil field or gas field operations, for example for drilling, cementing and completion operations.

In deep drillings for developing oil or natural gas deposits, the use of drilling muds and cement slurries has been known for a long time. The purpose of drilling muds is to deliver the rock fragments obtained by drilling and the so-called drilling fines to the surface, lubricate the bit and the drill string, to seal porous rock layers and to compensate the deposit pressure by means of hydrostatic pressure. For the last mentioned reason, drilling muds must have increased specific weight, which is achieved by adding, preferably, heavy spar, salts or clay. Further important features of drilling muds are temperature resistance and suitable flow properties which are only little affected by changes in the electrolyte concentration. The most widespread additives for controlling viscosity and loss of water of drilling muds are polymers, such as starch, carboxymethyl cellulose and carboxymethyl hydroxyethyl cellulose. Since the 1950s, copolymers of the acrylamide/acrylate type have been used predominantly in salt-free drilling mud systems. During the 1970s, salt-stable copolymers with monomers (U.S. Pat. Nos. 3,629,101, 4,048,077, 4,309,523) containing sulfo groups and being stable up to more than 200° C. were developed.

Furthermore, cement slurries and completion fluids are used as drilling fluids in deep drillings for oil or natural gas. After they have reached a certain depth, iron pipes, so-called casings, are introduced into the borehole, through the cavity of which the bit is passed for drilling of the next lower rock layers. To this end, the casings have to be fixed, i.e. cement slurry has to be pumped into the cavity between the rock and the outer walls of the casings, the so-called annular space, which slurry hardens to give solid stone. The resulting cement stone has to be impermeable to gases and liquids, so that no gas and/or oil can flow from the reservoir formation into other formations or to the surface. Very high demands are made on the cement slurry to be pumped. It should be readily pumpable, i.e. have the lowest possible viscosity, but nevertheless show no separation. The water release of the cement slurry to the porous rock should be low so as to prevent formation of thick filter cakes on the wall of the borehole, which would increase the pumping pressure as a result of the narrowing in annular space to such an extent that the porous rock forms cracks. Moreover, in the case of excessive water release, the cement slurry would not completely set and would become permeable to gas and oil. On the other hand, the resulting cement jacket in the annular space must quickly reach certain strengths, and during setting no shrinkage must occur leading to flow channels for gas, oil and water. Optimum adjustment of the properties of the cement slurry is only possible by means of additives.

The most important additives for controlling setting are retardants, accelerators, dispersants for liquefaction and agents for reducing water loss. Some of these additives have more than one function. Dispersants such as lignosulfonates and polymethylenenaphthalene sulfonates retard setting and reduce water loss to some extent. Some agents for reducing water loss retard stetting and drastically increase viscosity.

Effective agents for reducing water loss from cement and gypsum slurries used in practice comprise a wide range of polymers, copolymers and combinations thereof. The first effective products, which are still used today, are hydroxyethyl- and carboxymethyl hydroxyethyl cellulose. Hydroxyethyl cellulose increases viscosity and somewhat retards setting.

Carboxymethyl hydroxyethyl cellulose has a stronger retarding effect, which, however, can be compensated by accelerators. With increasing temperature, the effect of the cellulose ethers drops substantially. In subsequent years, many different fully synthetic polymers of higher temperature stability have been proposed and are in use. U.S. Pat. No. 3,994,852 describes polyvinylpyrrolidone/polyacrylamide copolymers; U.S. Pat. No. 4,015,991 describes hydrolyzed acrylamide/2-acrylamido-2-methylpropane sulfonate copolymers; EP-A-0,192,447 describes dimethylacrylamide/2-acrylamido-2-methylpropanesulfonate copolymers and EP-A-0,116,671 describes 2-acrylamido-2-methylpropanesulfonate, acrylamide (partially hydrolyzed) and vinylamide terpolymers, which are used in cement slurries for controlling water loss.

More recently copolymers based an 2-acrylamido-2-methylpropanesulfonate were developed which can be used as additives for drilling as well as for cementing. In U.S. Pat. No. 6,380,137 a copolymer comprising of 2-acrylamido-2-methylpropanesulfonic acid, N-vinylformamide and N-vinylpyrrolidone is described as effective additive for fluid loss with the linear and the cyclic N-vinylamides being important for a good performance.

In U.S. Pat. No. 6,395,853 the copolymer effective for fluid loss reduction consists of 2-acrylamido-2-methylpropanesulfonic acid, N-vinylphosphonic acid and an ammonium containing monomer that is either diallyldimethylammonium chloride or 1-N-acrylamidopropyl-3-trimethylammonium chloride.

In U.S. Patent Publication 2011/0263465 copolymers having an improved biodegradability are disclosed for drilling mud and cementation requiring certain amide units.

Further polymer dispersions are known from U.S. Pat. No. 6,465,397 and from DE-10-2005-056436 A1, the latter requires N-vinylamide units in the polymer and needs to the dispersed in glycol and/or glycol-ether compounds; from U.S. Pat. No. 5,379,841 and U.S. Patent Publication 2006/0019835 which relate to water inflow problems in underground formations; from U.S. Pat. No. 6,395,853 which requires certain cationic units in the polymer.

Further polymer dispersions are known from WO 2013/152832 which relates to sulfide scale inhibition.

Further polymer dispersions are utilizing grafted polymers, e.g. U.S. Patent Publication 2010/0240802 and U.S. Pat. No. 7,360,598.

It is necessary to adjust the cement slurry in each case using the cement available at the derrick and the additive in accordance with requirements.

The large number of compounds developed makes it clear that it is always difficult to formulate an optimum cement slurry. In the case where the individual parameters are predetermined by the type of cementation, the necessary properties have to be set to acceptable values using additives. The high number of compounds developed for reducing water loss shows how problematic it is in most cases to set the water release to the required value without significantly increasing viscosity, to set the setting time to the required value and to minimize sedimentation. The previously known polymers reducing water loss strongly increase the viscosity of the cement slurries, which in most cases have high density, to greater of lesser degrees. However, for ready pumpability of the cement slurries, viscosity must be kept low. The pumping rate should be such that a turbulent flow is possible. Only under these conditions complete displacement of the drilling mud does take place. This is a prerequisite of good cementation. In the case of inclined drillings, the mud can only be readily displaced by a strong turbulent flow.

For completing oil and natural gas wells, salt solutions of high density are used, which compensate the deposit pressure. During this, their infiltration of the deposit must be kept to a minimum. However, hydroxyethyl celluloses are not suitable for temperatures of more than 200° C. occurring there and the high salinities and densities brought about by $CaCl_2$ and $CaBr_2$.

Object of the invention is to provide a method that effectively reduces the fluid loss from fluids for drilling, cementing and completion especially at high temperatures and ensures a low viscosity of the fluid for easy pumpability.

Surprisingly it was found that copolymers of high molecular weight comprising structural units carrying sulfonic acid groups, such as structural units obtained from 2-(meth)acryl-amido-2-methylpropanesulfonic acid, and comprising structural units carrying phosphonic acid groups, such as structural units obtained from vinylphosphonic acid, and comprising structural units carrying amide groups, such as structural units obtained from (meth)acrylamide meet these requirements.

This object is achieved by a method for reducing water loss in aqueous slurries of particulate solids and/or in aqueous solutions for oil field and/or gas field operations, e.g. for drilling, cementing and completion, that is characterized by the step of adding to the fluid a copolymer having a high molecular weight described by a K value of 300 and more determined as 0.1 weight-% copolymer concentration in deionized water, said copolymer comprising (i) 0.1 to 20 weight % of structural units of formula (I),

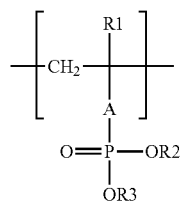

and (ii) 5 to 90 weight % of structural units of formula (II),

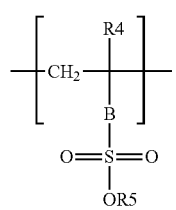

and (iii) 5 to 75 weight % of structural units of formula (III)

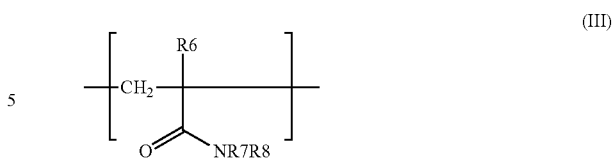

and (iv) up to 20 weight % of structural units of formula (IV), said structural unit of formula (IV) is different from structural units of the formula (II),

wherein

B is a two-valent organic bridge group, and if structural units of formula (IV) are present, B can also be a covalent bond forming a direct linkage, R9 is hydrogen or C1-C6-alkyl, R10 is hydrogen, a cation of an alkaline metal, of an earth alkaline metal, and/or of ammonia wherein the sum of the structural units of formulae (I), (I), (III), and (IV) if present, amounts to 100 weight % of the total mass of the copolymer and R1, R4 and R6 are independently of one another hydrogen or C1-C6-alkyl, R2, R3 and R5 are independently of one another hydrogen, a cation of an alkaline metal, of an earth alkaline metal, of ammonia and/or of an organic amine, R7 and R8 are independently of one another hydrogen or C1-C6-alkyl, A is a covalent C—P bond or a two-valent organic bridge group, and B is a two-valent organic bridge group, with the proviso, that the copolymer is added to said slurry or to said solution in the absence of any glycol and/or glycol-ether compounds.

The copolymer used in the method of this invention comprises structural units of formulae (I), (I) and (III).

The copolymer used in the method of this invention is not a grafted polymer. Grafted polymers are not within the meaning of the instant invention when referring to a copolymer.

The K value is a well established parameter for the molecular weight of a polymer (see Rompp, $9^{th}$ edition, pages 2418). The K value is also well known to a skilled worker in the art of the instant materials, see for example U.S. Pat. Nos. 6,465,397, 6,395,853, WO 2013/152832. The K value used is the Fikentscher K value (referenced in DIN EN ISO 1628-1) obtained by dilute solution viscometry and solving Fikentscher equation.

In an further embodiment of the instant invention the copolymer having a high molecular weight described by a K value of 300 and more determined as 0.1 weight-% copolymer concentration in deionized water, comprises (i) 0.1 to 20 weight % of structural units of formula (I),

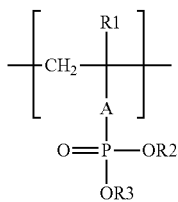
(I)

and
(ii) 5 to 90 weight % of structural units of formula (II),

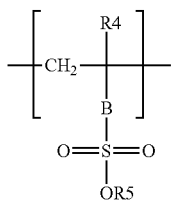
(II)

and
(iii) 5 to 75 weight % of structural units of formula (III)

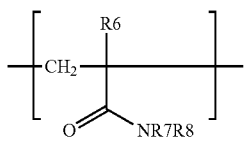
(III)

and
(iv) structural units of formula (IV)

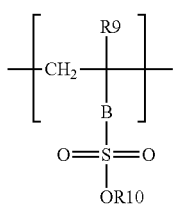
(IV)

in an aggregate amount between 0.1 to 20 weight % of the total mass of the copolymer
wherein the sum of the structural units of formulae (I), (I), (III) and (IV) amounts to 100 weight % of the total mass of the copolymer and
R1, R4 and R6 are independently of one another hydrogen or C1-C6-alkyl,
R2, R3 and R5 are independently of one another hydrogen, a cation of an alkaline metal, of an earth alkaline metal, of ammonia and/or of an organic amine,
R7 and R8 are independently of one another hydrogen or C1-C6-alkyl,
A is a covalent C—P bond or a two-valent organic bridge group, and
B is a two-valent organic bridge group.
R9 is hydrogen and/or C1-C6-alkyl,
R10 is hydrogen, a cation of an alkaline metal, of an earth alkaline metal, and/or of ammonia.

In case the structural unit of formula (IV) being present, the structural unit of formula (IV) is different from structural units of the formula (II). Further, in structural units of formula (IV) the radical B can also be a covalent bond forming a direct linkage.

C1-C6-alkyl groups may be straight-chain or branched. Examples of alkyl groups are methyl, ethyl, n-propyl, iso-propyl, n-butyl, sec.-butyl, tert.-butyl, n-pentyl or n-hexyl. Ethyl and especially methyl are preferred alkyl groups.

Group A may be a C—P-covalent bond or a two-valent organic group. Examples thereof are C1-C6-alkylene groups. These groups may be straight-chain or branched. Examples of alkylene groups are —CqH2q- groups, with q being an integer between 1 and 6. Methylene or a C—P-covalent bond is a preferred group A.

Group B is a two-valent organic group. Examples thereof are C1-C6-alkylene groups or —CO—C1-C6-alkylene groups. The alkylene groups may be straight-chain or branched. Examples of B groups are —CqH2q- groups or —CO—NH—CqH2q- groups, with q being an integer between 1 and 6. The two-valent organic group —CO—NH—C(CH3)2-CH2- is a preferred group B.

The structural units of formulae (I), (II), (II) and (IV) are obtained from at least an ethylenically unsaturated phosphonic acid, an ethylenically unsaturated carboxylic acid amide selected from the group of acrylamide, methacrylamide and/or their N—C1-C6-alkyl derivatives, a selected ethylenically unsaturated sulfonic acid and/or their alkaline metal salts and/or their ammonium salts optionally together with further copolymerizable monomers forming the structural unit of formula (IV).

Preferred copolymers used in the method of this invention are those, wherein R1, R4 and R6 are independently of one another hydrogen or methyl or wherein R2, R3 and R5 are independently of one another hydrogen or a cation of an alkali metal, of an earth alkaline metal, and/or of ammonia or wherein R7 and R8 are independently of one another hydrogen, methyl or ethyl, preferably hydrogen.

Other preferred copolymers used in the method of this Invention are those, wherein A is a C—P covalent bond or a —CnH2n- group with n being an integer between 1 and 6, preferably 1, or wherein B is a —CO—NH—CmH2m- group with m being an integer between 1 and 6, preferably between 2 and 4, B being most preferably a group —CO—NH—C(CH3)2-CH2-.

Still other preferred copolymers used in the method of this invention are those, wherein R9 is hydrogen or methyl.

Preferably applied are copolymers with structural units of formula (I), said units are typically formed by using vinylphosphonic acid and/or its alkaline metal salts and/or its ammonium salts, and/or allylphosphonic acid and/or its alkaline metal salts and/or its ammonium salts.

Also preferably applied are copolymers with structural units of formula (II), said units are typically formed by using 2-acrylamido-2-methylpropane sulfonic acid, 2-methacrylamido-2-methylpropane sulfonic acid and/or their alkaline metal salts and/or their ammonium salts.

The copolymers used in the method of this invention comprise structural units of formula (III), said units are typically formed by using acrylamide, methacrylamide and/or from their N—C1-C6-alkyl derivatives.

The further copolymerizable monomers which are optionally used in the manufacture of the copolymers and which are forming structural units of formula (IV) are preferably vinylsulfonic acid or its alkali metal salts or its ammonium salts.

The amount of structural units of formula (I) in the copolymer used in this invention which are obtained from ethylenically unsaturated phosphonic acid is typically in the range of 0.1 to 20 weight %, preferably from 0.5 to 5 weight %, referred to the total mass of the copolymer.

The amount of structural units of formula (II) in the copolymer used in this invention which are obtained from an ethylenically unsaturated sulfonic acid is typically in the range of 5 to 90 weight %, preferably from 20 to 70 weight %, referred to the total mass of the copolymer.

The amount of structural units of formula (III) in the copolymer used in this invention which are obtained from an amide of an ethylenically unsaturated carboxylic acid is typically in the range of 5 to 75 weight %, preferably from 10 to 50 weight %, referred to the total mass of the copolymer.

The amount of structural units of formula (IV) in the copolymer used in this invention which are obtained from other co-monomers as from co-monomers forming the structural units (I), (II) and (III) is typically not higher than 20 weight %, preferably not higher than 15 weight %, referred to the total mass of the copolymer.

The copolymers used in the method of this invention are added as water binders to aqueous suspensions of particulate solids, for example to cement slurries, to gypsum slurries as well as to mortars, or to drilling muds or are added to aqueous solutions, including saline solutions. In these systems, water release to porous layers can be substantially reduced by adding the copolymer comprising units with structural formulae (I), (II) and (III) and optionally (IV).

The concentration of the copolymer added to aqueous suspensions of particulate solids is between 0.1 to 4 weight-%, it being possible for the aqueous suspensions of particulate solids to contain 2-75 weight-% solids. Non-limiting examples of particulate solids are bentonite to increase the viscosity of drilling muds, barite, chalk and for iron oxide to increase the density of drilling muds or cement for cementing purposes.

For application in aqueous solutions the copolymer concentration is between 0.2 to 8 weight-%.

Aqueous solutions comprising the copolymer with structural units of formulae (I), (II) and (III) and optionally (IV) preferably contain $CaCl_2$ and/or $CaBr_2$ which increase their density above 1 g/ml, preferably to a density of 1.4 to 1.81 g/ml.

Copolymers comprising units of formula (II) derived from the monomer 2-acrylamido-2-methylpropane sulfonic acid, comprising units of formula (I) derived from the monomer vinylphosphonic acid and comprising units of formula (III) derived from the monomers acrylamide and/or dimethylacrylamide have proven to be particularly suitable.

The average molecular weight of the copolymers used according to the invention is higher than 1,000,000 Dalton, preferably higher than 3,000,000 Dalton.

The average molecular weight can be determined via gel permeation chromatography (GPC). Commercially available polymers, e.g. from acrylamide with molecular weight of 1,140,000 Dalton and 5,550,000 Dalton, can be used as standards. For separation of the sample a column consisting of a polyhydroxymethacrylate copolymer network with a pore volume of 30,000 Angstrom (Å) can be used.

The K value according to Fikentscher serves as indicator for the average molecular weight of the copolymers according to the invention. To determine the K value, the copolymer is dissolved in a certain concentration (generally 0.5 weight %, in the instant invention 0.1 weight %) and the efflux time at 25° C. is determined by means of an Ubbelohde capillary viscometer. This value gives the absolute viscosity of the solution ($\eta_c$). The absolute viscosity of the solvent is $\eta_o$. The ratio of the two absolute viscosities gives the relative viscosity $\eta_{rel}$ $$\eta_{rel} = \eta_c/\eta_o$$

From the relative viscosity, the K value can be determined as a function of the concentration c by means of the following equations:

$$\text{Log } \eta_{rel} = [(75k^2/(1+1.5kc)+k]c$$

$$k = K/1000$$

The K value of the copolymers used according to the invention is 300 and higher determined as 0.1 weight % copolymer concentration in deionized water, preferably the K value is higher than 350.

The copolymers used in the invention can be synthesized via different radical polymerization techniques, e.g. solution polymerization, gel polymerization, and particularly inverse emulsion polymerization. The advantage of inverse emulsion polymerization is the high molecular weight of the obtained copolymer. Further, the copolymer which is present in the inverse emulsion can be hydrated very fast. Another advantage is the handling of a liquid with a high content of copolymer that is easier than the handling of aqueous solutions with low copolymer content or the handling of wet gels from gel polymerization or the handling of fine powder obtained from dried copolymer from gel polymerization. According to the invention the inventive polymer is preferably synthesized via inverse emulsion polymerization.

The polymerisable monomers can normally be used in commercial quality, so without further purification. The copolymers used in the invention are synthesized in a per se known procedure, e.g. gel polymerization, solution polymerization and preferably inverse emulsion polymerization, in a way that the monomers to be polymerized are subjected to a radical copolymerization.

As part of this description, radical copolymerization means that at least three monomers, which are capable of forming structural units of formulae (I), (II) and (III), optionally (IV), and which are capable of being radically polymerized with each other under the conditions of a radical copolymerization. Thus, copolymers with statistical or alternating distribution of the structural units derived from the at least three monomers, or block-copolymers where blocks from the particular monomers are build up and are covalently linked to each other, are obtained.

The process of inverse emulsion polymerization is known per se. In this preferred polymerization process first an aqueous or water-miscible hydrophilic phase containing the monomers is finely dispersed in a water-immiscible organic phase containing water-in-oil emulsifiers and then the polymerization is started by e.g. radical initiators.

The co-monomers to be polymerized are advantageously dissolved subsequently in the hydrophilic phase. Where applicable, solid monomers can be dissolved in liquid monomers. The co-monomers can form the hydrophilic phase by itself and be emulsified
as such in the water-immiscible organic phase or preferred the co-monomers are dissolved in water and are emulsified as an aqueous solution. Water insoluble or slightly soluble monomers are normally dissolved in the hydrophobic liquid before addition of the aqueous solution. As part of this description "water soluble" means that 1 g substance is soluble in 1 liter water at 25° C.

The hydrophilic phase contains from 10 to 100 weight % co-monomers and from 0 to 90 weight % water referred to the total mass of the hydrophilic phase. The preferred process of inverse emulsion polymerization is typically performed in a 20 to 60 weight % aqueous solution of monomers (referred to the total mass of the aqueous phase).

As hydrophobic liquid a water insoluble, inert liquid is used. Such liquids are e.g. organic solvents, preferably hydrocarbons as e.g. cyclohexane, n-pentane, n-hexane, n-heptane,
i-octane, technical mixtures of hydrocarbons, toluene, xylene, halogenated hydrocarbons as e.g. chlorobenzene, o-dichloro-benzene. Also mixtures of different organic solvents are applicable.

To emulsify the monomer phase in the water-immiscible organic phase to give a water-in-oil emulsion, a lipophilic surfactant that prevents the finely divided aqueous layer from coalescence is typically dissolved in the applied hydrophobic liquid and. Suitable lipophilic surfactants are organic substances with a low HLB-value as e.g. sorbitane esters, sorbitane oleates or sorbitane stearates, or ethoxylated fatty amides, glycerine fatty acid esters as glycerine oleate or diacetyl tartaric acid ester of fatty acid glycerides or poly siloxanes.

HLB-value means the hydrophilic-lipophilic balance of a surfactant and is a measure of the degree to which it is hydrophilic or lipophilic, determined by calculating values for the different regions of the molecule. There are different methods to calculate the HLB-value. The most common results in a ranking of the surfactants between 0 and 20 with 0 corresponds to a completely lipophilic/hydrophobic molecule, and a value of 20 corresponds to a completely hydrophilic/lipophobic molecule. Typically the suppliers specifies the HLB-value of the surfactant.

In the preferred process of inverse emulsion polymerization the HLB-value of the lipophilic surfactants is less than 10.

The lipophilic surfactant or a mixture of different lipophilic surfactants are typically used in amounts from 0.05 to 15 weight %, preferably 0.1 to 10 weight %, referred to the total mass of the formulation.

The volumes of the hydrophilic and hydrophobic phases are typically in a ratio of 0.5-10:1.

The dispersion of the hydrophilic co-monomer containing solution into the lipophilic surfactant containing hydrophobic solution is performed in conventional style, preferably via vigorous stirring. It is beneficial to perform the co-polymerization under exclusion of oxygen. This is ensured via passing of inert gas, e.g. nitrogen, through the reaction mixture.

The copolymerization is started in a manner known per se, e.g. UV-light, high energy radiation, typically by addition of a mixture of soluble, radical producing initiators to the water-in-oil emulsion. Suitable initiators are organic or inorganic per- and azocompounds, e.g. benzoyl peroxide, tert-butyl hydroperoxide, cymol peroxide, methyl ethyl ketone peroxide, lauroyl peroxide, tert-butyl perbenzoate, tert-butyldiperphthtalate, azodiisobutyronitrile, 2,2'-azo-bis(2,3-dimethylvaleronitrile), 2-phenyl-azo-2,4-dimethyl-4-methoxy-valeronitrile, 2-cyano-2-propyl-azoformamide, azo-diisobutyramide, dimethyl-, diethyl- or dibutyl-azo-bis-methylvalerate, potassium persulfate, ammonium persulfate, hydrogen peroxide.

Referred to the total mass of monomers preferably 0.001 to 2 weight %, especially preferably 0.01 to 0.1 weight %, initiator are used. The radical initiator or the mixture of different radical initiators can be added to the hydrophilic and/or to the hydrophobic phase or to the emulsion.

The polymerization reaction is carried out in a temperature range from −20° C. to 200° C., preferred from 10 to 90° C. The applied pressure is typically atmospheric pressure in case the boiling point of either the aqueous phase or the organic phase is not reached at the chosen temperature. If the boiling point of either the hydrophilic phase or the organic phase is higher than the polymerization temperature an elevated pressure is applied to avoid boiling. In any case, the polymerization can be carried out at elevated pressure if desired.

The copolymerization is typically finished after 0.3 to 3 h. After completion of the copolymerization the copolymer is present as dispersion in a water-in-oil phase.

The finished water-in-oil dispersion typically consists of 20 to 90 weight % aqueous phase, referred to the total mass of the formulation. The aqueous phase contains basically the complete copolymer, having typically a concentration in the range of 20 to 60 weight %, referred to the total mass of the aqueous layer. The continuous hydrophobic phase of the water-in-oil polymer dispersion, namely the liquid hydrocarbon solution and the lipophilic surfactants are typically present in the range of 10 to 80 weight %, referred to the total mass of the formulation.

For the application in fluid for drilling, cementing or completion the copolymers of the inverse copolymer emulsion must be set free from the micelles into the application fluid. This is done by destroying the micelles after dosing the inverse copolymer emulsion into water or aqueous electrolyte solution and either applying sufficient mechanical energy via stirring or by adding a suitable surfactant with HLB>10 to the diluting water or aqueous electrolyte solution. This process is called inversion. In the presence of a suitable surfactant the inversion is complete within a very short period of time, e.g. some seconds, without building of agglomerates. The surfactant with HLB>10 can also be added directly to the inverse copolymer emulsion.

The copolymerization can also be performed as gel polymerization. With this technique typically 5 to 60 weight % of monomers (referred to the total mass of the mixture) are polymerized in water or a solvent mixture from water and another completely water miscible solvent, e.g. alcohol, using known suitable catalyst system without mechanically mixing of the solution under utilization of the Tromsdorff-Norrisch-effect (Makromol. Chem. 1947, 1, 169).

The gel polymerization is beneficially performed under exclusion of oxygen, e.g. in an inert atmosphere with nitrogen at temperatures from −20° C. to 200° C., preferred from 10 to 90° C. The applied pressure is typically atmospheric pressure in case the boiling point of the mixture is not reached at the chosen temperature. In any case the polymerization can be carried out at elevated pressure if desired.

The copolymerization can be initiated by high energy radiation or typically by addition of a mixture of soluble, radical producing Initiators, for example organic or inorganic per- and azo-compounds, e.g. benzoyl peroxide, tert-butyl hydroperoxide, cymol peroxide, methyl ethyl ketone peroxide, lauroyl peroxide, tert-butyl perbenzoate, tert-butyldiperphthtalate, azodiisobutyronitrile, 2,2'-azo-bis(2,3-dimethylvaleronitrile), 2-phenyl-azo-2,4-dimethyl-4-methoxy-valeronitrile, 2-cyano-2-propyl-azoformamide, azo-diisobutyramide, dimethyl-, diethyl- or dibutyl-azo-bis-methylvalerate, potassium persulfate, ammonium persulfate, hydrogen peroxide if appropriate in combination with reducing agents, e.g. sodium bisulfite and iron (II) sulfate, or redox systems which have for example sulfinic acid as reducing compound. As a rule 0.001 to 2 g of the polymerization initiator per 100 g of monomers are used.

The copolymers used in the method of this invention are present in the form of an aqueous gelatinous mass and can be mechanically grinded and dried and therefore be obtained in solid form. Preferably the aqueous gelatinous mass is directly applied.

The invention also relates to the use of a copolymer having a K-value of 300 and more and comprising the structural units of formulae (I), (II) and (III) and optionally (IV) in amounts defined above as additives for the reduction of water loss in aqueous slurries or in aqueous solutions used in oil field and/or gas field operations. In this context, the copolymer is added to said slurry or to said solution in the absence of any glycol and/or glycol-ether compounds.

Preferably the copolymers having a K-value of 300 and more and comprising the structural units of formulae (I), (II) and (III) and optionally (IV) are used as additives for reducing the loss of water from fluids for drilling, cementing and completion. In this context, the copolymer is added to said fluids in the absence of any glycol and/or glycol-ether compounds.

The preparation of the copolymers is illustrated by the following examples:

EXAMPLE 1: PREPARATION OF COPOLYMER 1

37 g sorbitan monooleate were dissolved in 160 g C11-C16 iso-paraffin. 100 g water in a beaker was cooled to 5° C., and then 200 g 2-acrylamido-2-methylpropane sulfonic acid (AMPS) and 10 g vinylphosphonic acid (VPS) were added. The pH was adjusted to 7.1 with aqueous ammonia solution. Subsequently 160 g acryl amide (AM) solution (60 weight % in water) were added.

Under vigorous stirring the aqueous monomer solution was added to the iso-paraffin mixture. The emulsion was the purged for 45 min with nitrogen.

The polymerization was started by addition of 0.5 g azoisobutyronitrile in 12 g iso-paraffin and heated to 50° C. To complete the reaction the temperature was increased to 80° C. and held at this temperature for 2 h. The polymer emulsion was cooled to room temperature.

For the tests the inverse copolymer emulsion is inverted by adding the corresponding quantity of the emulsion to achieve the desired copolymer concentration to an aqueous or saline solution containing 1 weight % of a surfactant with a HLB>12.

EXAMPLES 2 TO 7

In Table 1 the copolymers synthesized according to the inverse emulsion polymerization are summarized, the compositions are given in weight %:

TABLE 1

| Example no. | AMPS | VPS | AM | NNDMA | VSS | K-value |
|---|---|---|---|---|---|---|
| 2 | 62 | 2 | 36 | | | 381 |
| 3 | 68 | 2 | 30 | | | 398 |
| 4 | 61 | 1 | | 38 | | 405 |
| 5 | 80 | 1 | | 19 | | 410 |
| 6 (comp.) | 50 | 0 | | 50 | | 422 |
| 7 (comp.) | 85 | 0 | 5 | 5 | 5 | 375 |

TABLE 1-continued

| Example no. | AMPS | VPS | AM | NNDMA | VSS | K-value |
|---|---|---|---|---|---|---|

NNDMA = N,N-dimethlyacrylamide
VSS = Vinylsulfonic acid

EXAMPLE 8: PREPARATION OF COPOLYMER 8

1000 nil water, 80 g AMPS and 2 g vinylphosphonic acid are added with stirring. The solution is adjusted to pH 7.2 with 20 weight % NaOH solution. Then 50 g N,N-dimethylacrylamide are added.

The solution is then purged with a gentle N2 stream and slowly heated to 40° C. Then a 10 weight % solution of $Na_2S_2O_8$ is added to start the polymerization which is indicated by an increase in temperature and viscosity. The mixture is heated to 80° C. and held for 2 h to complete the reaction.

During cooling the obtained gel is diluted with 500 ml water to ensure a better handling of the copolymer solution.

EXAMPLES 9 TO 11

Copolymers which were synthesized according to the gel polymerization described in example 8 are summarized in table 2:

TABLE 2

| Example no. | AMPS | VPS | AM | NNDMA | K-value |
|---|---|---|---|---|---|
| 9 | 74 | 4 | 22 | | 336 |
| 10 | 85 | 2 | | 30 | 398 |
| 11 (comp.) | 61 | 0 | 10 | 29 | 405 |

Copolymers according to the present invention and comparative copolymers were characterized by measuring the fluid loss of cement slurry. The slurry was prepared by adding 700 g of the cement to a stirred solution of 3.5 g copolymer in 308 g water. The cement slurry was transferred into a HTHP filtration cell and pressurized with 70 bar. The filtrate within 30 min was collected. For tests at elevated temperature a retarder was added to the slurry.

The cement used in all testings is a Dykerhoff Class G cement which satisfies the API Spec. 10A. issued by the American Petroleum Institute.

The fluid loss testing was performed in the absence of any glycol and/or glycol-ether compounds.

In Table 3 the results are summarized.

TABLE 3

| Example no. | Copolymer according to ex. | Temperature (° C.) | Fluid loss (ml/30 min) |
|---|---|---|---|
| 12 | 3 | 25 | 38 |
| 13 | 4 | 50 | 43 |
| 14 | 4 | 180 | 70 |
| 15 | 6 (comp.) | 150 | >150 |

It is evident that copolymers according to the Invention are effective fluid loss additives in cement slurries. The incorporation of vinylphosphonic acid into the copolymer ensures a good fluid loss behavior even at elevated temperatures.

To characterize the fluid loss properties of the copolymers according to the present invention for drilling applications, a drilling mud consisting of 4 weight % bentonite, 25 weight % NaCl, 1 weight % CaSO$_4$ and 1.5 weight % of copolymer was used.

The fluid loss of this drilling mud was determined in a HTHP filtration cell at ambient temperature applying 70 bar and measuring the fluid loss of the bentonite slurry. In addition the fluid loss of the slurry was determined after aging the suspension at 200° C. for 15 h and after cooling to ambient temperature again.

The fluid loss testing was performed in the absence of any glycol and/or glycol-ether compounds.

In Table 4 the results are summarized:

TABLE 4

| Example no. | Copolymer according to ex. | Fluid loss, (ml/30 min) without aging | Fluid loss (ml/30 min) after aging |
|---|---|---|---|
| 16 | 1 | 27 | 32 |
| 17 | 2 | 22 | 21 |
| 18 | 10 | 34 | 36 |
| 19 | 7 (comp.) | 40 | 102 |

Also for drilling muds it is shown that the copolymers according to the invention ensure a low fluid loss compared to comparative copolymers without vinylphosphonic acid.

The invention claimed is:

1. A method for reducing water loss in aqueous slurries of particulate solids and/or in aqueous solutions for oil field and/or gas field operations, said process comprising the steps of:
adding to the said slurry or to said solution a copolymer having a high molecular weight characterized by a K value of at least 300, determined as 0.1 weight % copolymer concentration in deionized water, said copolymer comprising
(i) 0.1 to 20 weight % of structural units of formula (I),

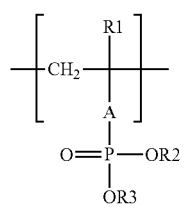

(I)

and
(ii) 5 to 90 weight % of structural units of formula (II),

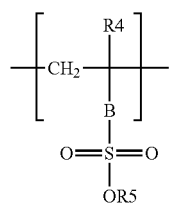

(II)

and
(iii) 5 to 75 weight % of structural units of formula (III)

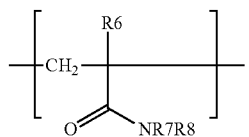

(III)

and
(iv) up to 20 weight % of structural units of formula (IV), said structural unit of formula (IV) is different from structural units of the formula (II),

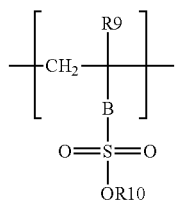

(IV)

wherein
B is a two-valent organic bridge group, and if structural units of formula (IV) are present, B can also be a covalent bond forming a direct linkage,
R9 is hydrogen or C$_1$-C$_6$-alkyl,
R10 is hydrogen, a cation of an alkaline metal, of an earth alkaline metal, and/or of ammonia,
wherein the sum of the structural units of formulae (I), (I), (III), and (IV) if present, amounts to 100 weight % of the total mass of the copolymer, and
R1, R4 and R6 are independently of one another hydrogen or C$_1$-C$_6$-alkyl,
R2, R3 and R5 are independently of one another hydrogen, a cation of an alkaline metal, of an earth alkaline metal, of ammonia and/or of an organic amine,
R7 and R8 are independently of one another hydrogen or C$_1$-C$_6$-alkyl,
A is a covalent C—P bond or a two-valent organic bridge group, and
B is a two-valent organic bridge group,
with the proviso, that the copolymer is added to said slurry or to said solution in the absence of any glycol and/or glycol-ether compounds.

2. The method according to claim 1, wherein R1, R4 and R6 are independently of one another hydrogen or methyl and R2, R3 and R5 are independently of one another hydrogen or a cation of an alkali metal, of an earth alkaline metal, or of ammonia and R7 and R8 are independently of one another hydrogen, methyl or ethyl, preferably hydrogen.

3. The method of claim 1, wherein A is a C—P covalent bond or a —C$_n$H$_{2n}$ group with n being an integer between 1 and 6, and B is a —CO—NH—C$_m$H$_{2m}$— group with m being an integer between 1 and 6.

4. The method of claim 1, wherein R9 is hydrogen or methyl.

5. The method according to claim 1, wherein the copolymer comprises
(i) 40 to 80 weight % of structural units of formula (II) and its alkali salts and/or ammonium salts,
(ii) 1 to 10 weight % of structural units of formula (I) and its alkali salts and/or ammonium salts and
(iii) 10 to 59 weight % of structural units of formula (III).

6. The method according to claim 1, wherein the copolymer is added to aqueous suspensions of particulate solids, cement slurries, gypsum slurries, mortars, or drilling muds or wherein the copolymer is added to aqueous solutions, including saline solutions.

7. The method according to claim 6, wherein concentration of the copolymer added to the aqueous suspensions of particulate solids is between 0.1 to 4 weight %.

8. The method according to claim 7, wherein the solids content of the final aqueous suspension of particulate solids is between 2 and 75 weight %.

9. The method according to claim 1, wherein the concentration of the copolymer added to the aqueous solutions is between 0.2 and 8 weight %.

10. The method according to claim 1, wherein to the aqueous solutions comprising the copolymer with structural units of formulae (I), (II) and (III), and (IV), adding $CaCl_2$ and/or $CaBr_2$ to increase the density of said aqueous solution above 1 g/ml.

11. The method of claim 3 wherein n is 1.

12. The method of claim 3 wherein m is between 2 and 4.

13. The method of claim 3 wherein B is —CO—NH—$C(CH_3)_2$—$CH_2$—.

14. The method of claim 10 wherein the density of said aqueous solution is in a range of 1.4 to 1.81 g/ml.

\* \* \* \* \*